United States Patent
Carson

(10) Patent No.: US 10,929,537 B2
(45) Date of Patent: Feb. 23, 2021

(54) SYSTEMS AND METHODS OF PROTECTING DATA FROM MALWARE PROCESSES

(71) Applicant: Digital Guardian, Inc., Waltham, MA (US)

(72) Inventor: Dwayne A. Carson, Mendon, MA (US)

(73) Assignee: Digital Guardian, Inc., Waltham, MA (US)

(*) Notice: Subject to any disclaimer, the term of this patent is extended or adjusted under 35 U.S.C. 154(b) by 329 days.

(21) Appl. No.: 15/223,947

(22) Filed: Jul. 29, 2016

(65) Prior Publication Data
US 2017/0032123 A1    Feb. 2, 2017

Related U.S. Application Data

(60) Provisional application No. 62/199,864, filed on Jul. 31, 2015.

(51) Int. Cl.
*G06F 21/56* (2013.01)
*G06F 21/62* (2013.01)
*G06F 21/52* (2013.01)

(52) U.S. Cl.
CPC ........... *G06F 21/567* (2013.01); *G06F 21/52* (2013.01); *G06F 21/6218* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 7,814,554 B1* | 10/2010 | Ragner | ................... | G06F 21/52 713/165 |
| 9,460,284 B1* | 10/2016 | Hajmasan | ............. | G06F 21/566 |
| 9,916,443 B1* | 3/2018 | Qu | ......................... | G06F 21/554 |
| 2002/0099952 A1* | 7/2002 | Lambert | .................. | G06F 21/51 726/27 |
| 2005/0182965 A1* | 8/2005 | Murillo | ............... | G06F 21/6218 726/5 |
| 2006/0265754 A1* | 11/2006 | Birrell | ................. | G06F 21/6218 726/26 |
| 2010/0043072 A1 | 2/2010 | Rothwell | | |
| 2012/0255017 A1 | 10/2012 | Sallam | | |

OTHER PUBLICATIONS

International Search Report and Written Opinion for PCT/US2016/044768 dated Oct. 27, 2016.

* cited by examiner

*Primary Examiner* — Henry Tsang
(74) *Attorney, Agent, or Firm* — Foley & Lardner LLP

(57) ABSTRACT

The present disclosure pertains to methods and systems for protecting data or other resources from malware. A driver executing in kernel mode of an operating system on a computing device may monitor one or more processes allowed to execute on the computing device. The one or more processes may include a first executing process. The driver may detect an attempt by a first thread of execution of the first executing process to access a protected file. The driver, responsive to the detection may identify a file type of the protected file. The driver, responsive to the identification of the file type, may determine whether the process is in a list of processes allowed for the file type. The drive may, responsive to determination, determine whether to deny or allow the first thread to access the protected file while allowing another thread of the executing process to execute on the computing device.

18 Claims, 5 Drawing Sheets

SYSTEMS AND METHODS OF PROTECTING DATA FROM MALWARE PROCESSES

RELATED APPLICATIONS

The present application claims the benefit of and priority to U.S. Provisional Patent Application No. 62/199,864, titled "SYSTEMS AND METHODS OF PROTECTING DATA FROM MALWARE PROCESSES," filed Jul. 31, 2015, the entire contents of which are hereby incorporated by reference for all purposes.

FIELD OF THE DISCLOSURE

This disclosure generally relates to systems and methods for controlling access to a resource, including but not limited to systems and methods for protecting data from potential malware.

BACKGROUND OF THE DISCLOSURE

An operating system executing on one or more processors of a computing device may be divided into two execution modes: (1) a user mode and (2) a kernel mode (also referred to as a system mode). An application may include one or more processes. Each process may include one or more threads. Each thread may include one or more subroutines or methods in an execution stack. The operating system may switch which execution mode it is running in depending on the thread. Each application may be initiated in the user mode. In some embodiments, in the user mode, each process cannot access memory addresses outside its own allocated memory addresses, such as the kernel or other applications. The kernel may refer to a controller of multiple processes. When a process attempts to access services outside the application, the operating system may switch temporarily to the kernel mode. While in kernel mode, the process can access any memory address, including those outside the memory addresses allocated to the process.

BRIEF SUMMARY OF THE DISCLOSURE

Described herein are systems and methods for protecting data or other resource from potential malware. Malware refers to a variety of forms of hostile or intrusive software, including computer viruses, worms, trojan horses, ransomware, spyware, adware, scareware, and other malicious programs. It can take the form of executable code scripts, active content, and other software. Embodiments of the present systems and methods can be used to protect data from exfiltration, movement, and/or damage by malware which is injected into a process or otherwise using the process to access the data, whether the process is legitimate or includes malware. Illustrative applications for the present systems and methods may include, but not limited to, determining whether to allow access by an executable process to one or more protected resources. Certain aspects of this disclosure are directed to detecting a process initiated to perform an operation, determining whether the process is allowed to access a protected resource, and determining whether to block access by the process to the protected resource.

In some embodiments, by using a rule system in user mode or kernel mode, a thread of a process can be examined for the context of the process, if the system detects that the thread of the process is attempting to access a file (e.g., a Word document). The file may be a protected and/or classified file or document. Upon detecting that the thread of the process is requesting to access the file, the system may determine whether to allow the thread of the process to have access to the file based on the type of the file or document for instance. The system may identify the file type or document type of the file that the thread of the process is attempting to access. The system may also determine whether the process is in a list of approved processes (also referred to as a "whitelist") that are validated and/or allowed to access a file of the identified file type. The list of processes may include, for example, information as to one or more file types or classifications that the process is allowed to access. The system may further determine whether to allow the thread of the process access to the file based on criteria that is for example related to the context within which the process is running. Unlike other approaches that prevent a process not on a whitelist of processes from running on the system, the current rule system may determine whether to allow a thread of a process to access the file at the point in time when the thread of the process is attempting to access to the file, thereby allowing all processes to run irrespective of whether the process is known to be legitimate. At the point in time when the thread of the process is attempting to access the file, the system may examine the list of processes to determine whether to allow the thread of the process to access the file. The information in the list of processes (e.g., regarding one or more allowed document types and/or file locations) may then be used in making a determination as to whether to allow the thread of the process to access the file.

In some aspects, the present disclosure pertains to a method of protecting data or other resources from malware. A driver operating in kernel mode of an operating system may receive a request to access a protected file. The driver may identify, responsive to receiving the request to access the protected file, a file type of the protected file. The driver may determine responsive to receiving the request to access the protected file, whether the process is in a list of processes, and if so, the type(s) of files the process is allowed to access. The driver may determine, responsive to the determination, whether to block or allow the process to access the protected file.

In some aspects, the present disclosure pertains to a system of protecting data or other resources from malware. The system may include a driver operating in kernel mode of an operating system. The driver may be configured to receive a request to access a protected file. The driver may be configured to identify, responsive to receiving the request to access the protected file, a file type of the protected file. The driver may be configured to determine responsive to receiving the request to access the protected file, whether the process is in a list of approved processes, and if so, the files type(s) of files the process is allowed to access. The driver may be configured to determine, responsive to the determination, whether to block or allow the process to access the protected file.

In some aspects, the present disclosure pertains to a method of protecting data and resources from malware. A driver may execute on a computing device. The driver may monitor one or more processes allowed to execute on a computing device. The one or more processes may include a first executing process. The driver may detect an attempt by a first thread of execution of the first executing process to access a protected file. The driver, responsive to the detection may identify a file type of the protected file. The driver, responsive to the identification of the file type, may determine whether the process is in a list of processes allowed for the file type. The driver may, responsive to determination, determine whether to deny or allow the first thread to access the protected file while allowing another thread of the executing process to execute on the computing device.

In some embodiments, the driver may execute in kernel mode of the computing device. In some embodiments, determining whether the process is in the list of processes may include identifying a type of operation corresponding to the attempt to access the protected file. In some embodiments, determining whether the process is in the list of processes may include comparing the type of operation to permitted types of operation included in the list of processes allowed for the file type of the protected file.

In some embodiments, determining whether the executing process is in the list of processes may include generating a hash value of the process. In some embodiments, determining whether the executing process is in the list of processes may include comparing the generated hash value to hash values in the list of processes allowed for the file type of the protected file.

In some embodiments, identifying the file type may include identifying the file type using at least one of a file extension of the protected file, the information associated with the protected file, or the content of the protected file. In some embodiments, the driver may determine, responsive to determining that the executing process is excluded from the list of processes allowed for the file type of the protected file, to deny the first thread to access the protected file, while allowing another thread of the executing process to execute on the computing device.

In some embodiments, the driver may determine to allow the first thread to access the protected file, responsive to determining that the process is in the list of processes allowed for the file type of the protected file, and that no other criteria from a rule engine is applicable. In some embodiments, the driver may determine to allow the first thread to access the protected file, responsive to determining that the process is in the list of processes allowed for the file type of the protected file, and that additional criteria from a rule engine is met, the additional criteria based on at least one of a context of the process or information about the protected file.

In some embodiments, determining whether to deny or allow the first thread to access the protected file may include determining whether the first thread is attempting to write, copy or transmit any portion of content of the protected file. In some embodiments, determining whether to deny or allow the process may further include identifying a memory allocation size for the executing process to access the protected file. In some embodiments, determining whether to deny or allow the process may further include comparing the size of the memory allocation size to a minimum memory allocation threshold for the executing process specified in a criteria.

In some aspect, the present disclosure pertains to a system for protecting data and resources from malware. The system may include an event handler driver and a rule engine executing on a computing device having one or more processors. The event handler driver may monitor one or more processes allowed to execute on a computing device, the one or more processes including a first executing process. The event handler driver may detect an attempt by a first thread of execution of the first executing process to access a protected file. The event handler driver may identify, responsive to the detection, a file type of the protected file. The rule engine may determine, responsive to the identification of the file type, whether the process is in a list of processes allowed for the file type. The rule engine may determine, responsive to the determination, whether to deny or allow the first thread to access the protected file while allowing another thread of the executing process to execute on the computing device.

In some embodiments, the event handler driver may execute in kernel mode of the computing device. In some embodiments, the rule engine may determine whether the process is in the list of processes by identifying a type of operation corresponding to the attempt to access the protected file. In some embodiments, the rule engine may determine whether the process is in the list of processes by comparing the type of operation to permitted types of operation included in the list of processes allowed for the file type of the protected file.

In some embodiments, the rule engine may determine whether the process is in the list of processes by generating a hash value of the process. In some embodiments, the rule engine may determine whether the process is in the list of processes by comparing the generated hash value to hash values in the list of processes allowed for the file type of the protected file.

In some embodiments, the rule engine may identify the file type using at least one of a file extension of the protected file, the information associated with the protected file, or the content of the protected file. In some embodiments, the rule engine may deny, responsive to determining that the executing process is excluded from the list of processes allowed for the file type of the protected file, the first thread to access the protected file, while allowing another thread of the executing process to execute on the computing device. In some embodiments, the rule engine may allow the first thread to access the protected file, responsive to determining that the process is in the list of processes allowed for the file type of the protected file, and that no other criteria from a rule engine is applicable. In some embodiments, the rule engine may allow the first thread to access the protected file, responsive to determining that the process is in the list of processes allowed for the file type of the protected file, and that additional criteria from a rule engine is met, the additional criteria based on at least one of a context of the process or information about the protected file.

In some embodiments, the rule engine may determine whether to deny or allow the first thread to access the protected file, by determining whether the first thread is attempting to write, copy or transmit any portion of content of the protected file. In some embodiments, the rule engine may determine whether to deny or allow the process, by identifying a memory allocation size for the executing process to access the protected file. In some embodiments, the rule engine may determine whether to deny or allow the process, by comparing the size of the memory allocation size to a minimum memory allocation threshold for the executing process specified in a criteria.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
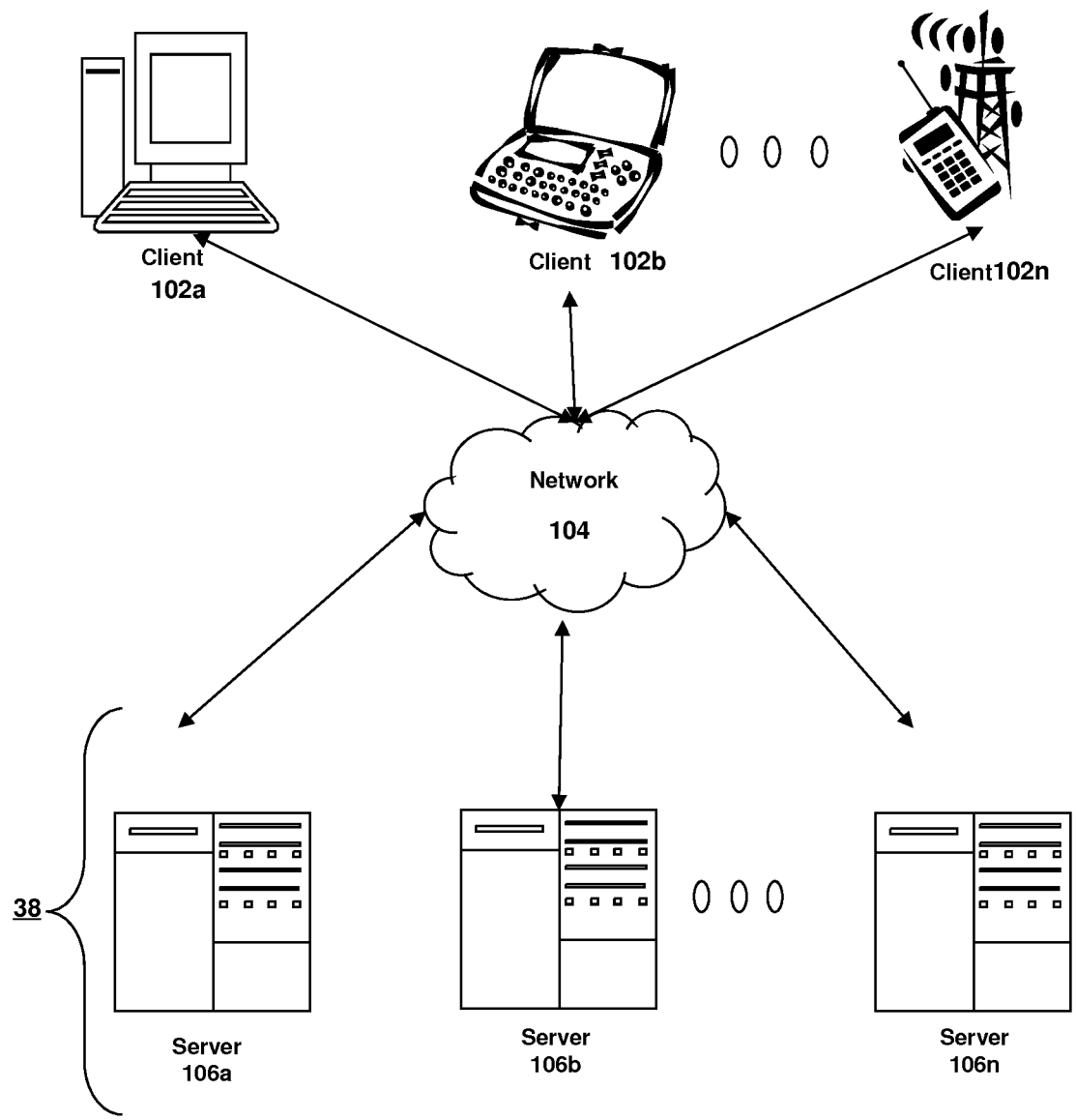
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for protecting data or other resources from malware.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual memories that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 106b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
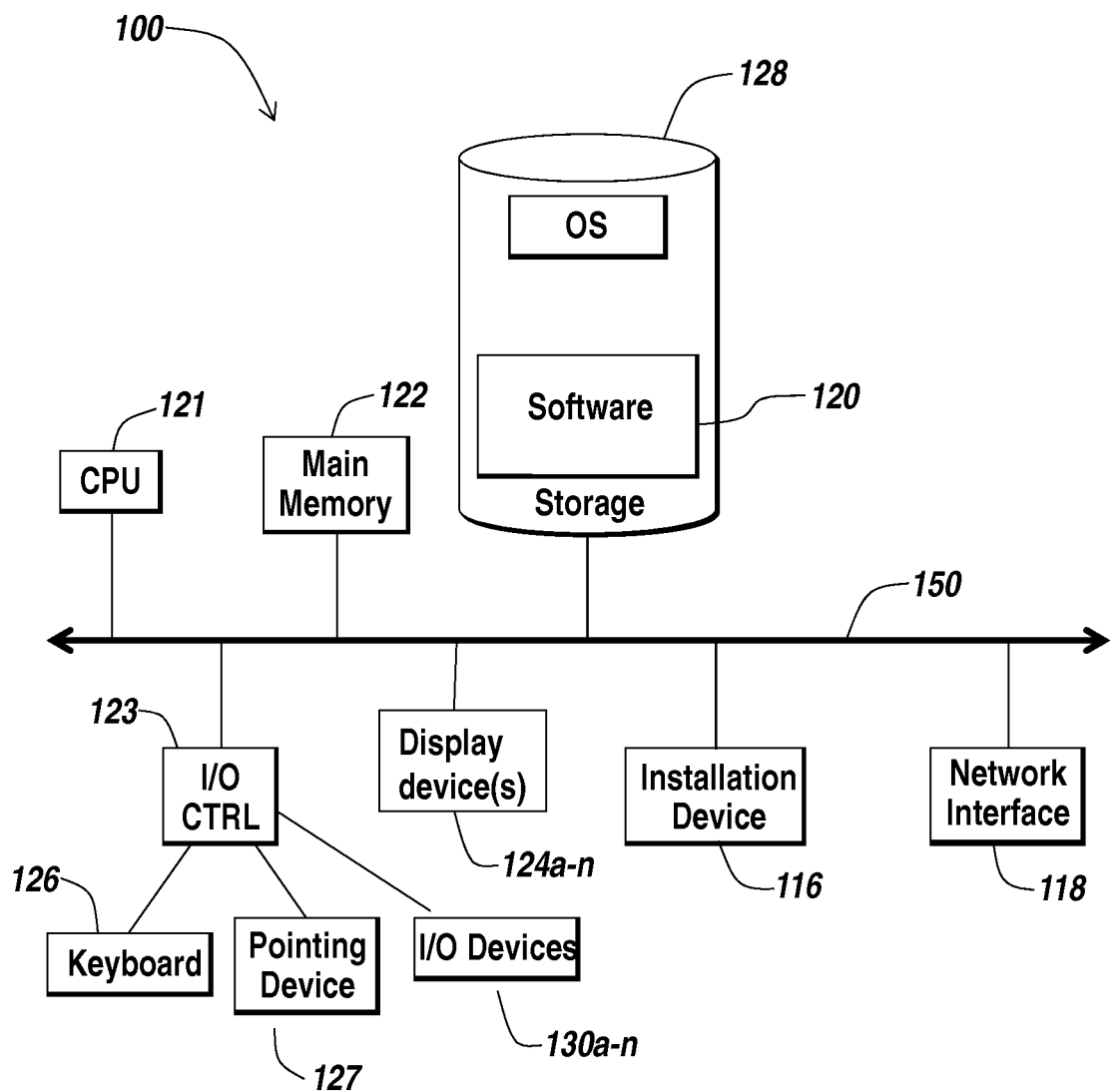
FIGS. 1B and 1C are block diagrams depicting embodiments of computing devices useful in connection with the methods and systems described herein.
Figure 1C:
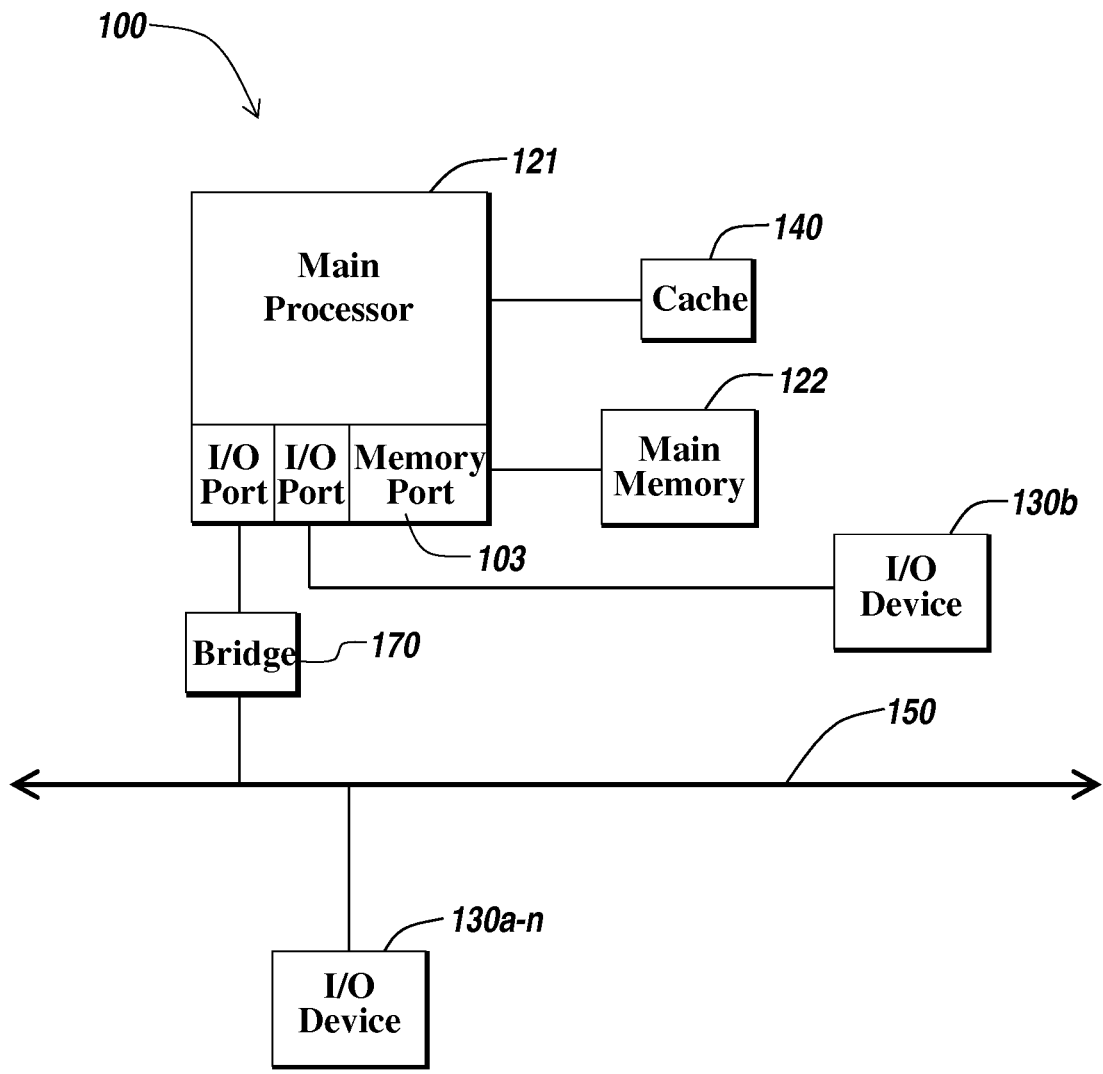

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 player. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Protecting Data or Other Resources from Malware

Described herein are systems and methods for protecting data or other resource from malware. For example, embodiments of the present systems and methods can be used to protect data from exfiltration, movement, and/or damage by malware which is inject in a process or otherwise using the process to access the data, whether the process is legitimate or a malware itself. Illustrative applications for the present systems and methods may include, but not limited to, determining whether to allow access by an executable process to one or more protected resources. Certain aspects of this disclosure are directed to detecting a thread of execution of a process initiated to perform an operation, determining whether the process is allowed to access a protected resource, and determining whether to block access by the process to the protected resource.

In some embodiments, by using a rule system in user mode or kernel mode, a thread of a process can be examined for the context of the process, if the system detects that the thread of the process is attempting to access a file (e.g., a MS Word document). The file may be a protected and/or classified file or document. Upon detecting that the thread of the process is requesting to access the file, the system may determine whether to allow the thread of the process to have access to the file based on the type of the file or document for instance. The system may identify the file type or document type of the file that the thread of the process is attempting to access. The system may also determine whether the process is in a list of processes (also referred to as a "whitelist") that are approved, validated and/or allowed to access the identified file type. The list of processes may include, for example, information as to one or more file types or classifications that the process is allowed to access. The system may further determine whether to allow the thread of the process access to the file based on criteria, e.g., related to the context within which the process is running. Unlike other approaches that prevent a process not on a whitelist of processes from running on the system, the current rule system may determine whether to allow a thread of a process to access the file at the point in time when the thread of the process is attempting to access to the file, thereby allowing all processes to run irrespective of whether the process is known to be legitimate. At the point in time when the thread of the process is attempting to access the file, the system may examine the list of processes to determine whether to allow the thread of the process to access the file. The information in the list of processes (e.g., one or more approved processes, allowed document types and/or file locations) may then be used in making a determination as to whether to allow the thread of the process to access the file. The system may allow the process to access the file, based at least in part on determining that the process is on the list of processes. For example, suppose the process is a MS WinWord process and the file that process is attempting to access is a classified MS Word file. In this example, the system may identify the file type as a MS Word document based on a file extension and/or contents of the file itself. The system may compare a digital signature to one or more digital signatures included in a list of processes. The system may generate a cryptographic hash (e.g., SHA1) of the process, and may compare the hash to information in the list of processes. The system may determine that the list of processes includes MS WinWord as a process permitted to access MS Word files, for example. Based on the determination and/or comparison, the system may allow the MS WinWord process access to the classified MS Word file.

Conversely, the system may deny the process to access to the file, upon determining that the process is not on the list of processes, while allowing the process to continue running on the computing device. For example, a malicious or damaging process or malware, such as ransomware may be operating on the computing device and may attempt to open a classified MS Word file to encrypt the file as part of a ransomware attack. The system may identify the corresponding file type as a Word file based on the extension and/or the contents of the file itself. The system may generate a cryptographic hash (e.g., SHA1) of the ransomware, and compare the cryptographic hash to a list of cryptographic hashes in a list of processes that are allowed to access certain types of files (e.g., MS Word files). Based upon this comparison, the system may determine that the cryptographic hash of the ransomware is not found in the list of processes, and may deny the process access to the MS Word document. It should be appreciated that in contrast to other whitelisting solutions that would not have allowed the malware process to start or continue running in the first place, the present system may allow the potential malware to run while preventing the potential malware from accessing (e.g., performing ransomware encryption attack on) the data or other protected resources.

By way of illustration and in some embodiments, the list of processes may refer to a memory range map which includes a list of executable regions within one or more processes. The executable regions either legitimately belong to a process, e.g., loaded from an executable (EXE) file of the process, or belong to one or more DLL's (libraries) that the process uses on a normal basis. If malware is present, one or more additional executable regions become present and are potentially referenced by the executing thread, on the thread's execution stack. If those regions are found and do not belong to the process legitimately, then access to the file that the thread is attempting can be blocked. The present system and methods may determine whether to allow or deny access to the protected file by validating executable memory regions referenced by the executing thread.

Each process has its own memory space, and one or more executable memory regions reside in the process at various points. For illustration purposes, a process, CALC.EXE is loaded in memory with the following executable modules (.exe or .dll) and corresponding memory regions:
ModLoad: 00007ff6'a3e30000 00007ff6'a3f19000 C:\Windows\system32\calc.exe
ModLoad: 00007ffa'6acc0000 00007ffa'6ae6c000 C:\Windows\system32\ntdll.dll
ModLoad: 00007ffa'68f50000 00007ffa'6908e000 C:\Windows\system32\KERNEL32.DLL
ModLoad: 00007ffa'67ef0000 00007ffa'68005000 C:\Windows\system32 \KERNELBASE.dll
ModLoad: 00007ffa'69160000 00007ffa'6a679000 C:\Windows\system32\SHELL32.dll
ModLoad: 00007ffa'68da0000 00007ffa'68df4000 C:\Windows\system32\SHLWAPI.dll
ModLoad: 00007ffa'65e40000 00007ffa'65ff0000 C:\Windows\WinSxS\amd64_microsoft.windows.gdiplus_6595b64144ccf1df_1.1.9600.17415_none_932b3b5547500489\gdiplus.dll
ModLoad: 00007ffa'68af0000 00007ffa'68b9a000 C:\Windows\system32\ADVAPI32.dll
ModLoad: 00007ffa'68620000 00007ffa'686e1000 C:\Windows\system32\OLEAUT32.dll
ModLoad: 00007ffa'66b00000 00007ffa'66c29000 C:\Windows\system32\UxTheme.dll
ModLoad: 00007ffa'68c00000 00007ffa'68d94000 C:\Windows\system32\ole32.dll
ModLoad: 00007ffa'660e0000 00007ffa'6635a000 C:\Windows\WinSxS\amd64_microsoft.windows.common-controls_6595b64144ccf1df_6.0.9600.17810_none_6240b9c7ecbd0bda\COMCTL32.dll
ModLoad: 00007ffa'684a0000 00007ffa'68617000 C:\Windows\system32\USER32.dll
ModLoad: 00007ffa'68e00000 00007ffa'68f41000 C:\Windows\system32\RPCRT4.dll
ModLoad: 00007ffa'66360000 00007ffa'66382000 C:\Windows\system32\WINMM.dll
ModLoad: 00007ffa'68350000 00007ffa'684a0000 C:\Windows\system32\GDI32.dll
ModLoad: 00007ffa'69090000 00007ffa'6913 a000 C:\Windows\system32\msvcrt.dll
ModLoad: 00007ffa'68760000 00007ffa'68971000 C:\Windows\SYSTEM32\combase.dll
ModLoad: 00007ffa'68990000 00007ffa'689e9000 C:\Windows\SYSTEM32\sechost.dll
ModLoad: 00007ffa'65ff0000 00007ffa'6601a000 C:\Windows\system32\WINMMBASE.dll
ModLoad: 00007ffa'680c0000 00007ffa'6810f000 C:\Windows\SYSTEM32\cfgmgr32.dll
ModLoad: 00007ffa'66ca0000 00007ffa'66cc8000 C:\Windows\system32\DEVOBJ.dll
ModLoad: 00007ffa'68ab0000 00007ffa'68ae6000 C:\Windows\system32\IMM32.DLL
ModLoad: 00007ffa'6a990000 00007ffa'6aae2000 C:\Windows\system32\WISCTF.dll
ModLoad: 00007ffa'66910000 00007ffa'66abe000 C:\Windows\system32\WindowsCodecs.dll
ModLoad: 00007ffa'66040000 00007ffa'66061000 C:\Windows\system32\dwmapi.dll
ModLoad: 00007ffa'66ac0000 00007ffa'66acb000 C:\Windows\SYSTEM32\kernel.appcore.dll
ModLoad: 00007ffa'67d60000 00007ffa'67d6b000 C:\Windows\system32\CRYPTBASE.dll
ModLoad: 00007ffa'67cf0000 00007ffa'67d53000 C:\Windows\system32\bcryptPrimitives.dll
ModLoad: 00007ffa'689f0000 00007ffa'68aa6000 C:\Windows\SYSTEM32\clbcatq.dll
ModLoad: 00007ffa'65c90000 00007ffa'65cfa000 C:\Windows\System32\oleacc.dll There are various executable memory regions owned by or allocated by DLL's loaded into the calc.exe process. These are libraries of executable code that the process calc.exe uses.

Some embodiments of the present systems and methods may, for example, check the process (CALC.EXE) against a list of approved processes when it accesses a classified/protected document. Certain embodiments of the present systems and methods may check an executing thread of the process when an attempt to access a protected resource if detected. For example, when an attempt to access a document occurs, each pointer found on an executing thread's stack in the process is checked to see what executable region, if any, it points to. For the illustrative list of memory regions shown above, if the memory pointer 00007ffa'68990500 is seen on the stack, it would be pointing to "sechost.dll". If sechost.dll is deemed to be legitimate (not a malware component), then the system would not stop access to the file. Other pointers on the stack can be checked the same way. If one pointer points to memory that is executable memory and is not found in the memory range map, the corresponding thread or process is likely to include potential malware and the system can deny access to the protected resource.

There can be some executable regions of memory in a process that do not reside in an EXE or DLL mapped region included in the memory range map. Instead, these may be allocated memory with executable code present. In this case, the owner (or allocator) of such memory regions may be examined, and these executable memory regions can be added to the memory range map with the original allocator as the owner. As such, non-library allocations can be checked via the memory range map when a thread's execution stack pointer is being validated.

Figure 2:
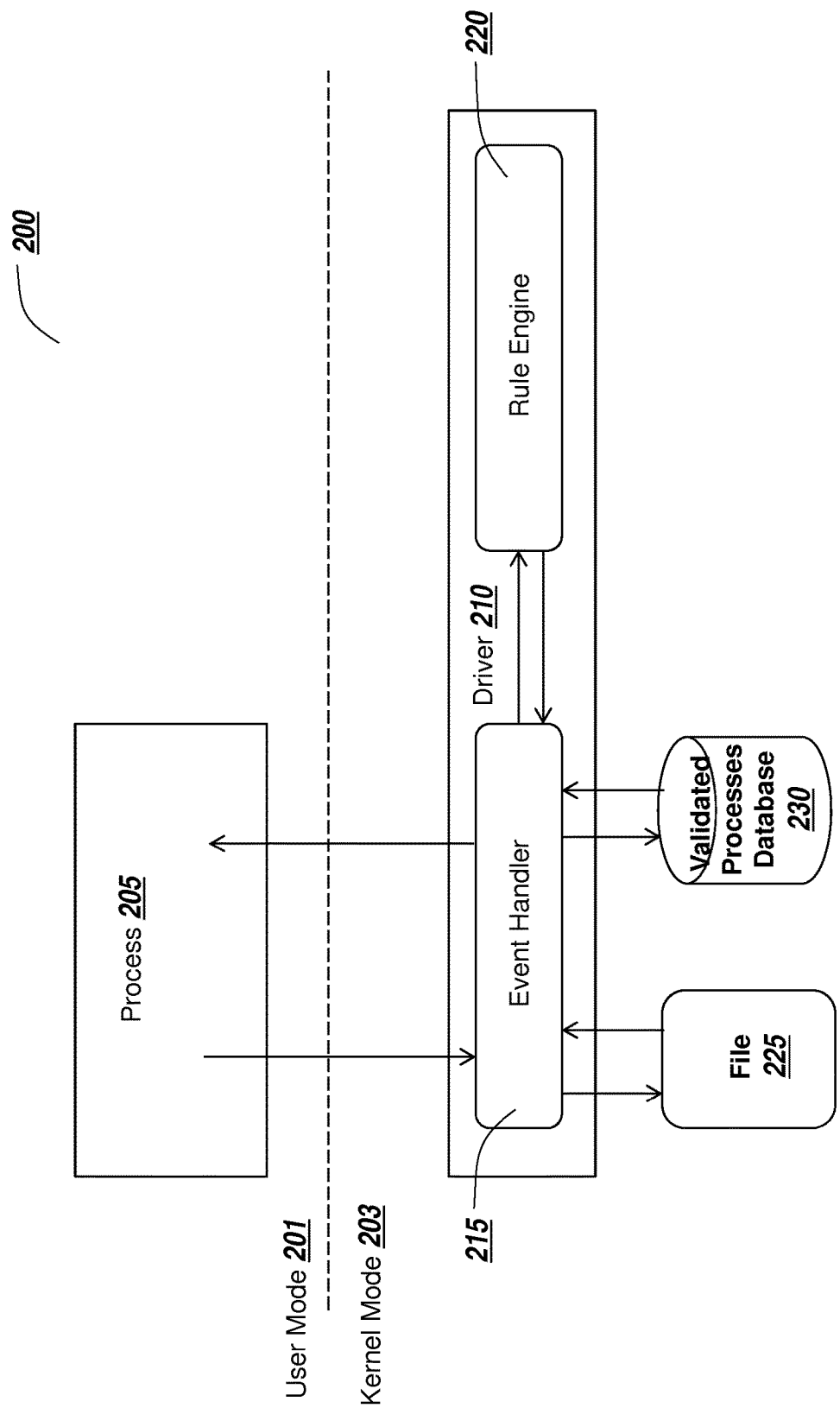
FIG. 2 is a block diagram depicting embodiments of a system for protecting data or other resources from potential malware.

Referring to FIG. 2, an embodiment of a system 200 for protecting data or other resources from malware is depicted. In brief overview, the system 200 may be subdivided or categorized into user mode 201 components and kernel mode 203 components. User mode 201 and kernel mode 203 may refer two distinct execution modes for operating systems running on a central processing unit (CPU). User mode 201 and kernel mode 203 may sometimes refer to the user mode memory and kernel mode memory space. The user mode memory space may include memory addresses allocated or assigned to the processes of the user mode 201. The kernel mode memory space may include memory addresses allocated or assigned to the kernel mode 203. In some embodiments, the user mode 201 may be referred to as a non-privileged mode, in which processes cannot access portions of memory that have been allocated to the kernel or to other processes. The kernel may include a controller of multiple processes and processes in the kernel mode 203 can access and control processes running on any memory address. Each process in the user mode 201 may correspond to a portion of the respective execution stack or call stack (e.g., one or more stack frames on the executing stack). The execution stack may be allocated or dedicated to executing threads of processes in the user mode 201. In system 200, the user mode 201 components may include a process 205 that may include one or more threads. When a process 205 attempts to access a memory address allocated to the kernel, the operating system may switch its execution mode to the kernel mode 203. The kernel mode 203 may be referred to as a privileged mode, in which processes may reference or access any memory, such as data or some other protected resource. In system 200, the kernel mode 203 components may include a driver 210, file 225, and a database 230 or list of processes. The driver 210 may include an event handler 215 and a rule system/engine 220.

Each of these components of system 200 may be controlled by, implemented using, or incorporate features of a computing device, for example as described above in connection with FIGS. 1A-1C. Each component, module, and any sub-module thereof, may include hardware or a combination of hardware and software. For example, a module or submodule may include any application, program, library, script, task, service, process or any type and form of executable instructions executing on any type and form of hardware of the system. In some embodiments, a module or submodule may incorporate one or more processors and/or circuitries configured to perform any of the operations and functions described herein. For example, systems 200 may run or execute on one or more processors, memory, and other devices of a computing system, such as the main processor 121, main memory 122, and storage 128 of computing device 100.

An application, executable or program (which can include a malware program) may include one or more processes 205. The one or more processes 205 may be initiated and/or executed in user mode 203. When a process 205 is instantiated or initiated, the process may operate in user mode 203 of the operating system. In some embodiments, a process 205 may include one or more threads, subprocesses, actions and executing memory regions, and may be itself malware or comprise malware. For example, a process 205 may include a main executable module or thread, and may include one or more other threads, subprocesses or modules. The one or more threads of the process 205 may be associated with a context. The context may refer to the environment in which the one or more threads of the process 205 are executed, and may include, for example, execution stack(s), resource(s) allotted, and memory address(es) or regions assigned to the one or more threads 205 of the process 205. The process 205 may be initiated or otherwise invoked, controlled or used by another process (e.g., by malware via a hook) to perform an operation. For example, even if a process or operation was not started by a malware, the malware may still gain control at some point by having hooked a corresponding application, DLL, or system interface that the process was making use of. Thus, a malware can attempt to access a protected data or resource, or use an existing legitimate handle to the data or resource. The process 205 may also be initiated or otherwise invoked (e.g., standalone, not by another process) to perform the operation. The process 205 itself may comprise one or more operations (e.g., of an executable application), or a subset of some operation. For example, the process 205 itself or the one or more threads of the process 205 may be a malicious process for example in the form of an executable (e.g., EXE, BAT, COM, CMD, etc.).

In some embodiments, the present systems and methods may include a driver 210. The driver 210 may operate in the kernel mode 203 of system 200. The driver 210 may include an event handler 215 and/or a rule engine/system 220. The process 205 or the one or more threads of the process 205 may attempt to access data or a protected resource, such as the file 225, which may be detected by the driver 210 or one or more other kernel mode 203 components. The file 225 may comprise data or other resource (e.g., Word file, spreadsheet file, text file, audio file, etc.) held, maintained or stored in a storage medium of a computing device. The file 225 may be any type of file that includes data or resources whose content or information may be opened by a process 205, or the one or more threads of the process 205, or application for reading and/or writing ("R/W"). The event handler 215 may intercept, detect, catch, or otherwise receive an attempt by the process 205 or the one or more threads of the process 205 to access the file 225, which may be in the form of a system call or application programming interface (API) call.

The event handler 215 may identify a file type and/or classification of the file 225 that the process 205 or the one or more threads of the process 205 is attempting to access. In some embodiments, the event handler 215 may identify the file type of the file 225 based on a corresponding file extension of the file 225. For example, if the filename extension of the file 225 is ".ofx," the event handler 215 may identify the file as an Open Financial Exchange (OFX) file type. In some embodiments, the event handler 215 may determine the file type of the file 225 based on information associated with the file 225 and/or contents of the file 225. The information associated with the file 225 used to determine the file type may include, for example, external metadata associated with each file 225 stored in the directory or system entry of the file 225. The contents of the file 225 used to determine the file type may include, for example, internal metadata of the file 225 such as the file header and file magic number stored within the file 225 itself. In some embodiments, the event handler 215 may read a portion (e.g., bytes) of the file 225 that the process 205 or the one or more threads of the process 205 is attempting to access, and identify the file type based on the portion (e.g., data structure, format, metadata, embedded parameters) of the file 225. For example, the first line of a file 225 may contain the string "<?xml version="1.0"?—." In this example, the event handler 215 may determine that the file 225 is an Extensible Markup Language (XML) file based on the characters "<?xml" in the first characters in the first line of the file 225.

The event handler 215 may determine whether the process 205 is identified in a process database 230, and whether the process 205 is associated with the file type of the file 225. The process database 230 may include a list of processes that are allowed or approved to access one or more specified file types of the file 225. In one or more embodiments, the event handler 215 may determine whether a list of processes allowed to perform an operation on file(s) of a first type includes the identified process 205. In some embodiments, the list of processes may specify which processes 205 and/or types of operations associated with the process 205 or the one or more threads of the process 205 may have access to the file 225. For example, the list may comprise a plurality of lists of processes each list of processes allowed or approved to access files of a certain type. In some embodiments, the list may comprise a list of processes, and information about which type(s) of files each process is allowed to access.

The event handler 215 may identify the type of the operation and/or access (e.g., read and/or write access) associated with the process 205 or the one or more threads of the process 205, and compare the identified type of operation and/or access with those referenced or included in the process database 230. For example, the event handler 215 may identify the operation of the process 205 or the one or more threads of the process 205 attempting to access the file 225 as an encryption operation in conjunction with a ransomware-attack, and compare the identified operation with those identified or included in the list of processes. In this example, upon determining that there is no match between the identified type of operation and those included in the list of approved processes, the event handler 215 may determine to deny or block the corresponding operation of the process 205 or the one or more threads of the process 205 on a protected resource.

In some embodiments, the list of processes may specify which processes 205 may have access to the file 225. The event handler 215 may generate and/or identify an identifier such as a digital signature or a cryptographic hash (e.g., SHA1) of the process 205 associated with the one or more threads. Using the identifier of the process 205, the event handler 215 may compare the identifier of the process 205 to those in the list of processes in the database 230 that are allowed access to the file 225 (e.g., of a file type specified in the database 230). Based on this comparison, the event handler 215 may determine whether the process 205 is in the list of processes allowed access to the protected file.

In some embodiments, responsive to determining that the process 205 is in the list of allowed processes, the event handler 215 may identify one or more access types approved for the process 205 (e.g., using information in the database 230). The event handler 215 may determine the type of access the process is attempting on the protected resource. The event handler 215 may compare the determined type of access to one or more access types approved for the process. In some embodiments, the list of processes may specify a file permission (e.g., read and/or write) corresponding to the file type of the file 225 for the process 205 associated with the one or more threads. For example, for spreadsheet file types, the list of processes may specify that certain processes 205 associated with the one or more threads may read and write to the file 225, while specifying that other processes 205 may only read the file 225 or have no permissions at all to access the file 225.

In some embodiments, responsive to determining that the process 205 is in the list of processes matched with the file type of the file 225, the event handler 215 may invoke, call, or otherwise send a request for the rule engine 220 to determine whether to allow the process 205 or the one or more threads of the process 205 to access the file 225 according to additional criteria (e.g., based on characteristics or information other than allowed file types). The additional criteria may be based on the context of the process 205 associated with the one or more threads, information associated with the file 225, or a combination thereof. In some embodiments, the rule engine 220 may determine whether to allow the process 205 to access the file 225 based on context of the process 205.

The context may refer to the environment in which one or more threads of the process 205 are executed, and may include, for example, resource(s) allotted to the process, memory address(es) assigned to the process 200, and parent-child relationships to other process(es), past accesses to the same or similar file by the process, among others. For example, the criteria may specify a minimum memory allocation threshold for the memory allocated to a process attempting to access file 225. In this example, the rule engine 220 may identify the memory allocated to the process 205 or the one or more threads of the process 205 attempting to access the file 225. If the memory allocation for the process 205 is greater than the minimum memory allocation threshold, the rule engine 220 may determine to allow the process 205 to access the file 225. In another example, the criteria may specify that processes attempting to access the file 225 may not be a child or subprocess of another process. In this example, if the process 205 is invoked or instantiated by another process, the rule engine 220 may determine to deny the process 205 from accessing the file 225.

In some embodiments, the rule engine 220 may identify information associated with the file 225. The information associated with the file 225 may include, for example, file type, file location (e.g., pathname), file encryption indicator, and file size, among others. For example, the additional criteria may specify that files 225 in a particular file location, for instance in the personal, private directory of another user account, may not be accessed by the process 205 or the one or more threads of the process 205. If the process 205 or the one or more threads of the process 205 attempts to access such a file 225, the rule engine 220 may determine to deny this operation of the process 205 or the respective thread(s) to access the file 225. The rule engine 220 may return the result of the determination of whether to allow or block the process 205 or the respective thread(s) to access the file 225, to the event handler 215. The event handler 215 may in turn return this determination to the process 205, e.g., by granting or denying the process 205 or the respective thread(s) the access to the file 225. In some embodiments, blocking or denying a thread of the process may include preventing the thread from further execution (e.g., of additional stack frames in the corresponding execution stack). In certain embodiment, the stack frame(s) corresponding to or related to the attempt to access the protected file is prevented or blocked from execution. For instance, the driver may allow the thread to skip a portion of the execution stack (e.g., the stack frames or execution steps being prevented or blocked, or associated with the access attempt), and continue to subsequent portions of the execution stack.

In certain embodiments, the rule engine 220 may allow the process 205 to access the file 225 based on the additional criteria, even when the event handler 215 has determined that the process 205 is not on the list of processes specific to one or more particular file types. For instance, certain types of operations consistent with file permissions of a file 225 are not denied by the rule engine. In some embodiments, the additional criteria may specify an override indicator, indicating to allow access irrespective of whether the event handler 215 has determined that the process 205 is on the list of approved processes for the file type of the file 225. For example, the criteria may specify that processes 205 that only read the file 225 and do not transmit content of the file 225 over a computer network (e.g., network 104 of FIG. 1A) be allowed access to file 225. In some embodiments, the rule engine 220 may traverse through the additional criteria to identify one or more criteria to apply in allowing or blocking the process 205 or the one or more threads of the process 205. In some embodiments, the rule engine 220 may determine that no criterion is applicable to the process 205 or the one or more threads of the process 205. The rule engine 220 may allow the process 205 or the one or more threads of the process 205 to access the file 225 responsive to determining that no other criteria is applicable. The rule engine 220 may return the result of the determination of whether to allow or block the process 205 to access the file 225, to the process 205 via the event handler 215.

Figure 3:
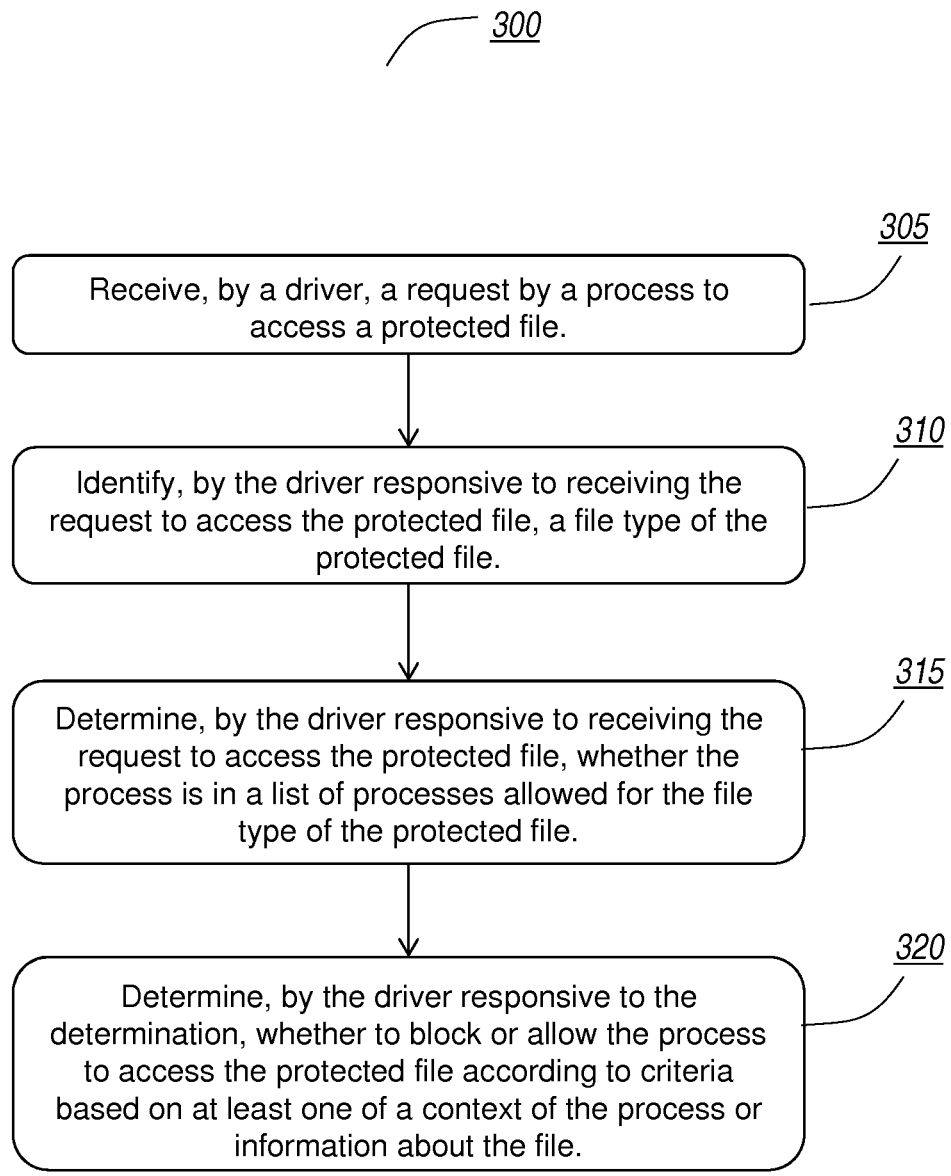
FIG. 3 is an illustrative embodiment of a flow diagram of protecting data or other resources from malware.

Referring to FIG. 3, a flow diagram or method 300 for protecting data or other resources from malware according to an illustrative embodiment is depicted. The method 300 can be performed or executed by the driver 210, and/or any one or more components of system 200. For example, the method 300 can be executed by the event handler 215 and/or rule engine 220 of the driver 210, responsive to detecting an attempt by the process 205 to access the file 225. In brief overview, the method may include receiving a request to access a protected file (step 305). The method 300 may include identifying, by the driver responsive to receiving the request to access the protected file, a file type or classification of the protected file (step 310). The method 300 may include determining, by the driver responsive to receiving the request to access the protected file, whether the process is in a list of processes approved for the file type of the protected file (step 315). The method 300 may include determining, by an event handler responsive to determining that the process is in the list of processes approved for the file type of the protected file, whether to block or allow the process to access the protected file (step 320).

Referring to step 305, and in more details, the method 300 may include identifying, by a driver, responsive to receiving a request to access a protected file, a file type of the protected file. For example, the event handler 215 of the driver 210 may monitor one or more processes 205 allowed to execute on the computing device. Each of the one or more executing processes 205 may include one or more threads. One of the one or more threads of a process 205 may attempt to access a protected file. The event handler 215 may intercept, detect, catch, or otherwise receive the attempt (e.g., via a system or API call) by the process 205 or the thread of the process 205 to access the file 225. The process 205 or the thread of the process 205 may attempt to access a data or protected resource, such as file 225, while operating on a kernel mode 203 side of the operating system. The file 225 may comprise data or another resource stored, maintained or held in a storage medium of a computing device (e.g., storage 128 of system 100), and may correspond to any type of file that includes data that may be accessed by a process 205 or a thread of the process 205 for reading and/or writing by the process 205. The attempt to access the data or the protected resource may include, for example, reading and/or writing and may be in the form of an application programming interface (API) call or a system call.

Referring to step 310, and in more details, the method 300 may include identifying, by the driver responsive to receiving the request to access the protected file, a file type of the protected file. For example, the event handler 215 of the driver 210 may identify the file type or other classification of the file 225 that the process 205 or at least one of the threads of the process 205 is attempting to access based on the file extension of the file 225, and/or information associated with, and/or content of the file 225. The event handler 215 may identify the filename extension (e.g., ".txt") from the file name of the file 225. The event handler 215 may for example determine, identify or extract information associated with the file 225, and based on the information, determine the file type of the file 225. The information associated with the file 225 may include external metadata, such as entries stored by the computing system (e.g., storage 128 of system 100). The event handler 215 may in some embodiments identify or read the content of the file 225, and based on the content, determine the file type of the file 225. Content of the file 225 that can be used to determine the file type of the file 225 may include file header and/or file magic number stored within the file 225 itself, by way of illustration. For example, the event handler 215 may read the first few bytes of the file 225 for the file header to determine the file type of the file 225.

Referring to step 315, and in more details, the method 300 may include determining, by the driver responsive to receiving the request to access the protected file, whether the process is in a list of processes approved for the file type of the protected file. For example, the event handler 215 of the driver 210 may determine whether the process 205 associated with the one or more threads is in a list of processes from a database 230 maintained in the system. The list of processes may specify which processes 205 and/or types of operations are approved corresponding to a particular type of files. In some embodiments, the list of processes may specify which types of operations and/or types of files are allowed for each process. In some embodiments, the event handler 215 may identify or determine the type of the operation associated with the process 205 or the one or more threads of the process 205. The type of the operation (e.g., read and/or write) may correspond to the attempt to access the protected file. The event handler 215 may compare the identified type of operation with those referenced or approved in the database 230.

In some embodiments, the event handler 215 may generate a digital signature or a hash value (e.g., cryptographic hash such as SHA1) of the process 205. The digital signature or the hash value of the process 205 may be calculated using the content, memory address, or any other identifier(s) for the process 205 or the one or more threads of the process 205. The event handler 215 may then compare the digital signature or hash value of the process 205 associated with the one or more threads to those signatures and values listed in the list of validated processes from the validated processes database 230. The digital signatures and the hash values of the list of validated processes may be calculated, generated, or otherwise determined using the content, memory address, or any other identifier(s) of previously validated processes. In some embodiments, the event handler 215 may retrieve the digital signatures and the hash values of previously validated processes from a database of the operating system (e.g., the validated processes database 230). In some embodiments, the list of validated processes may specify a certain file permission (e.g., read and/or write)

to allow access by the process 205 or the one or more threads of the process 205. In some embodiments, a file permission may be specified for a specific type of file. In one or more embodiments, upon determining that the process 205 associated with the one or more threads is in the list of processes, the event handler 215 may identify an access type or level granted to the process 205 or the one or more threads of the process 205, based on the specified file permission for example.

Referring to step 320, and in more details, the method 300 include determining, by the driver responsive to determining that the process is in the list of validated processes for the file type of the protected file, whether to block or allow the process to access the protected file. For example, responsive to determining that the process 205 associated with the one or more threads is in the list of approved processes (e.g., for the file type of the file 225), the event handler 215 may send a request to the rule engine 220 of the driver 210 to determine whether to allow or block the process 205 or the one or more threads of the process 205, to access the file 225 while allowing other threads of the process 205 to execute on the computing device. In some embodiments, the rule engine 220 may determine whether to deny or allow the process 205 or the one or more threads of the process 205 to access the protected file 225 based on additional criteria (e.g., other than file type). The additional criteria may be based on the context of the process 205 or the one or more threads of the process 205, information associated with the file 225, or a combination thereof, used to determine whether the process 205 or the one or more threads of the process 205 has access to the file 225. Information associated with the file 225 may, for example, include file type, file location (e.g., pathname), file encryption indicator, and file size, among others. The context of the process 205 may refer to the environment in which the one or more threads of the process 205 are executed, and may include, for example, resources allotted to the process, and memory address assigned to the process 205 or the one or more threads of the process 205, and parent-child relationships to other process, among others. In some embodiments, if the process 205 associated with the one or more threads is in the list of processes from the database 230, and meets the additional criteria, the process 205 or the one or more threads of the process 205 may be allowed access to the file 225 by the rule engine 220. In some embodiments, regardless of whether the process 205 associated with the one or more threads is in the list of validated processes from the validated processes database 230, the process 205 or the one or more threads of the process 205 may be allowed or blocked by the rule engine 220 from accessing the file 225, based on the additional criteria.

In some embodiments, the rule engine 220 may traverse through the additional criteria to identify one or more criteria to apply in allowing or deny access to the protected file 225 for the process 205 or the one or more threads of the process 205. For each criterion, the rule engine 220 may identify the corresponding context for the process 205 (e.g., memory allotted to the process 205). For example, the additional criterion may specify a minimum memory allocation thread for accessing the protected file 225. In this scenario, the rule engine 220 may identify a memory allocation size for the process 205 or a thread of the process 205 attempting to access the protected file 225 and then compare the size of the memory allocation size of the process 205 or the thread to the minimum memory allocation threshold specified in the additional criteria.

If the event handler 215 determines that the process 205 or the one or more threads of the process 205 is excluded from the list of processes allowed for the file type of the protected file 225, the rule engine 220 may determine to deny the process 205 or the one or more threads of the process 205 to access the protected file 225. In some embodiments, even if the event handler 215 determines that the process 205 or the one or more threads of the process 205 is excluded from the list of processes allowed for the file type of the protected file 225, the rule engine 220 may determine to allow the process 205 or the one or more threads of the process 205 to access the protected file 225 based on the additional criteria. In some embodiments, the additional criteria may also specify an override indicator, permitting access irrespective of whether the event handler 215 has determined that the process 205 is on the list of approved processes for the file type of the file 225. In some embodiments, the rule engine 220 may identify at least one criterion from the additional criteria to apply to the process 205 or the one or more threads of the process 205. In some embodiments, the rule 210 may allow access to the protected file 225 to the process 205 or the one or more threads of the process 205, even if determined to be excluded from the validated list of processes, responsive to identifying the at least one criterion.

If the event handler 215 determines that the process 205 or the one or more threads of the process 205 is in the list of processes allowed for the file type of the protected file 225, the rule engine 201 may determine to allow the process 205 or the one or more threads of the process 205 to access the protected file 225. In some embodiments, even if the event handler 215 determines that the process 205 or the one or more threads of the process 205 is in the list of processes allowed for the file type of the protected file 225, the rule engine 220 may determine to deny the process 205 or the one or more threads of the process 205 to access the protected file 225 based on the additional criteria. In some embodiments, the additional criteria may also specify an override indicator, restricting access irrespective of whether the event handler 215 has determined that the process 205 is on the list of approved processes for the file type of the file 225.

In some embodiments, the rule engine 220 may determine whether any of the additional criteria apply in allowing or blocking access to the protected file 225 for the process 205 or the one or more threads of the process 205. In some embodiments, the rule engine 220 may determine to allow access to the protected file 225, if no additional criteria are applicable to the process 205 or the one or more threads of the process 205. In some embodiments, the rule engine 220 may determine to block access to the protected file 225, if at least one criterion of the additional criteria are applicable to the process 205 or the one or more threads of the process 205. For example, additional criterion may specify that no thread or process is to write, copy, or transmit any portion of content of the protected file 225. In this example, if a thread of the process 205 is attempting to copy and transmit any portion of the protected file 225, the rule engine 220 may block the process 205 even if listed in the validated list or processes.

Thus, it should be appreciated that in contrast to conventional whitelist mechanisms, the method 300 may allow the process 205 and the one or more threads of the process 205 to continue to run without allowing certain access to protected resources such as files 225. For instance, the process 205 or the one or more threads of the process 205 may be allowed to continue to execute in the user mode and perform other operations. This may allow a user to run whatever software he/she wishes to run. Thus, a user can run the user's own tools as the user sees fit, except that the user may not be able to use these tools to access documents that a security administrator has specified should be accessed by applications on an allowed (white) list. This solution may allow a process (which can potentially be malware) to run, but prevents the process' attack on critical resources or files.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of protecting data and resources from malware, comprising:
    monitoring, by a driver executing in a kernel mode on a computing device, one or more processes allowed to execute in a user mode on the computing device, the one or more processes including a first executing process having a plurality of threads;
    detecting, by the driver, an attempt by a first thread of the plurality of threads of the first executing process from the user mode to access a protected file in the kernel mode;
    identifying, by the driver responsive to the detection, from a plurality of file types, a file type of the protected file of the kernel mode using at least one of content or metadata of the protected file;
    identifying, by the driver from a plurality of lists of processes, a list of processes for the identified file type, each list of the plurality of lists of processes defining a corresponding plurality of types of operations permitted for a corresponding file type;
    determining, by the driver, responsive to the identification of the file type, whether the attempt by the first thread corresponds to one of the plurality of permitted types of operations defined in the list of processes allowed for the identified file type; and
    determining, by the driver, responsive to the determination, whether to deny or allow the first thread from the user mode to access the protected file in the kernel mode while allowing another thread of the plurality of threads of the first executing process to execute in the user mode on the computing device.

2. The method of claim 1, wherein determining whether the process is in the list of processes comprising:
    identifying a type of operation corresponding to the attempt to access the protected file; and
    comparing the type of operation to the plurality of types of operations defined in the list of processes allowed for the identified file type of the protected file.

3. The method of claim 1, wherein determining whether the executing process is in the list of processes comprising:
    generating a hash value of the process; and
    comparing the generated hash value to hash values in the list of processes allowed for the file type of the protected file.

4. The method of claim 1, wherein identifying the file type comprises identifying the file type using at least one of a file extension of the protected file, the information associated with the protected file, or the content of the protected file.

5. The method of claim 1, comprising determining, responsive to determining that the executing process is excluded from the list of processes allowed for the file type of the protected file, to deny the first thread to access the protected file, while allowing another thread of the executing process to execute on the computing device.

6. The method of claim 1, comprising determining to allow the first thread to access the protected file, responsive to determining that the process is in the list of processes allowed for the file type of the protected file, and that no other criteria from a rule engine is applicable.

7. The method of claim 1, comprising determining to allow the first thread to access the protected file, responsive to determining that the process is in the list of processes allowed for the file type of the protected file, and that additional criteria from a rule engine is met, the additional criteria based on at least one of a context of the process or information about the protected file.

8. The method of claim 1, wherein determining whether to deny or allow the first thread to access the protected file comprises determining whether the first thread is attempting to write, copy or transmit any portion of content of the protected file.

9. The method of claim 1, wherein determining whether to deny or allow the process further comprising:
    identifying a memory allocation size for the executing process to access the protected file; and
    comparing the size of the memory allocation size to a minimum memory allocation threshold for the executing process specified in a criteria.

10. A system of protecting data and resources from malware, the system comprising:
    an event handler driver executable in a kernel mode on one or more hardware processors of a computing device, the event handler driver configured to:
        monitor one or more processes allowed to execute in a user mode on the computing device, the one or more processes including a first executing process having a plurality of threads;
        detect an attempt by a first thread of the plurality of threads of the first executing process from the user mode to access a protected file in the kernel mode; and
        identify, responsive to the detection, from a plurality of file types, a file type of the protected file of the kernel mode using at least one of content or metadata of the protected file; and
    a rule engine executable in the kernel mode on the one or more hardware processors, the rule engine configured to:

identify, from a plurality of lists of processes, a list of processes for the identified file type, each list of the plurality of lists of processes defining a corresponding plurality of types of operations permitted for a corresponding file type;

determine, responsive to the identification of the file type, whether the attempt by the first thread of execution corresponds to one of the plurality of permitted types of operations defined in the list of processes allowed for the identified file type; and determine, responsive to the determination, whether to deny or allow the first thread from the user mode to access the protected file in the kernel mode while allowing another thread of the plurality of threads of the first executing process to execute in the user mode on the computing device.

11. The system of claim 10, wherein the rule engine is configured to determine whether the process is in the list of processes by:

identifying a type of operation corresponding to the attempt to access the protected file; and comparing the type of operation to the plurality of types of operations defined in the list of processes allowed for the identified file type of the protected file.

12. The system of claim 10, wherein the rule engine is configured to determine whether the process is in the list of processes by:

generating a hash value of the process; and comparing the generated hash value to hash values in the list of processes allowed for the file type of the protected file.

13. The system of claim 10, wherein the rule engine is configured to identify the file type using at least one of a file extension of the protected file, the information associated with the protected file, or the content of the protected file.

14. The system of claim 10, wherein the rule engine is configured to deny, responsive to determining that the executing process is excluded from the list of processes allowed for the file type of the protected file, the first thread to access the protected file, while allowing another thread of the executing process to execute on the computing device.

15. The system of claim 10, wherein the rule engine is configured to allow the first thread to access the protected file, responsive to determining that the process is in the list of processes allowed for the file type of the protected file, and that no other criteria from a rule engine is applicable.

16. The system of claim 10, wherein the rule engine is configured to allow the first thread to access the protected file, responsive to determining that the process is in the list of processes allowed for the file type of the protected file, and that additional criteria from a rule engine is met, the additional criteria based on at least one of a context of the process or information about the protected file.

17. The system of claim 10, wherein the rule engine is configured to determine whether to deny or allow the first thread to access the protected file, by determining whether the first thread is attempting to write, copy or transmit any portion of content of the protected file.

18. The system of claim 10, wherein the rule engine is configured to determine whether to deny or allow the process, by:

identifying a memory allocation size for the executing process to access the protected file; and comparing the size of the memory allocation size to a minimum memory allocation threshold for the executing process specified in a criteria.

\* \* \* \* \*